(12) United States Patent
Nakajima (10) Patent No.: US 8,243,703 B2
(45) Date of Patent: Aug. 14, 2012

(54) COMMUNICATION SYSTEM, MANAGEMENT APPARATUS, CONTROL METHOD THEREFOR, STORAGE MEDIUM, REGISTRATION APPARATUS AND BASE STATION

(75) Inventor: Takafumi Nakajima, Mitaka (JP)

(73) Assignee: Canon Kabushiki Kaisha, Tokyo (JP)

( * ) Notice: Subject to any disclaimer, the term of this patent is extended or adjusted under 35 U.S.C. 154(b) by 205 days.

(21) Appl. No.: 12/446,747

(22) PCT Filed: Dec. 19, 2007

(86) PCT No.: PCT/JP2007/075041
§ 371 (c)(1),
(2), (4) Date: Apr. 22, 2009

(87) PCT Pub. No.: WO2008/075781
PCT Pub. Date: Jun. 26, 2008

(65) Prior Publication Data
US 2010/0020777 A1  Jan. 28, 2010

(30) Foreign Application Priority Data

Dec. 20, 2006 (JP) .............................. 2006-343055

(51) Int. Cl.
| | |
|---|---|
| H04W 4/00 | (2009.01) |
| H04B 7/00 | (2006.01) |
| H04L 12/26 | (2006.01) |
| H04L 9/32 | (2006.01) |
| H04L 29/06 | (2006.01) |
| G06Q 20/00 | (2006.01) |
| H04K 1/00 | (2006.01) |
| G06F 9/00 | (2006.01) |
| G06F 7/04 | (2006.01) |

(52) U.S. Cl. ........ 370/338; 370/310; 370/252; 370/328; 713/170; 713/155; 705/67; 380/270; 726/15; 726/9

(58) Field of Classification Search .................. 370/328, 370/338, 351–356; 709/217–222, 227–245; 455/41.2, 411, 418–420, 435.1; 726/3, 4, 726/6; 380/270–273, 278; 340/10.1; 713/168, 713/170
See application file for complete search history.

(56) References Cited

U.S. PATENT DOCUMENTS

| | | | |
|---|---|---|---|
| 6,715,071 B2 | 3/2004 | Ono et al. | |
| 2002/0018455 A1* | 2/2002 | Yokoyama | 370/338 |
| 2003/0041085 A1* | 2/2003 | Sato | 709/100 |
| 2003/0219129 A1* | 11/2003 | Whelan et al. | 380/270 |
| 2004/0076120 A1* | 4/2004 | Ishidoshiro | 370/252 |
| 2004/0156399 A1* | 8/2004 | Eran | 370/913 |
| 2005/0015467 A1 | 1/2005 | Noda | |
| 2005/0021959 A1* | 1/2005 | Tsushima et al. | 713/170 |
| 2005/0043019 A1 | 2/2005 | Nakamura et al. | |

(Continued)

FOREIGN PATENT DOCUMENTS

| | | |
|---|---|---|
| JP | 10-105516 A | 4/1998 |
| JP | 11-167550 A | 6/1999 |
| JP | 2003-101545 A | 4/2003 |
| JP | 2003-229872 A | 8/2003 |
| JP | 2004-7351 A | 1/2004 |
| JP | 2004-96146 A | 3/2004 |
| JP | 2005-86583 A | 3/2005 |
| JP | 2005-191721 A | 7/2005 |
| JP | 2004-13718 A | 1/2007 |

*Primary Examiner* — Warner Wong
*Assistant Examiner* — Kiet Tang
(74) *Attorney, Agent, or Firm* — Fitzpatrick, Cella, Harper & Scinto (57) ABSTRACT

A management apparatus transmits a registration message to a base station when executing a wireless parameter setting sequence. The base station registers the management apparatus upon the detection of the message. This makes it possible to decrease unwanted communication traffic, and to reduce the time taken to perform the wireless parameter setting processing.

10 Claims, 10 Drawing Sheets

U.S. PATENT DOCUMENTS

| | | |
|---|---|---|
| 2005/0054329 A1* | 3/2005 | Kokudo ................... 455/411 |
| 2005/0076244 A1* | 4/2005 | Watanabe ................ 713/201 |
| 2005/0119979 A1* | 6/2005 | Murashita et al. ........... 705/67 |
| 2005/0122919 A1* | 6/2005 | Touag ..................... 370/310 |
| 2005/0195781 A1* | 9/2005 | Ikeda ..................... 370/338 |
| 2005/0272371 A1 | 12/2005 | Komatsuzaki et al. |
| 2006/0045272 A1* | 3/2006 | Ohaka ..................... 380/270 |
| 2006/0080734 A1* | 4/2006 | Kim et al. ................. 726/15 |
| 2006/0174105 A1* | 8/2006 | Park ....................... 713/155 |
| 2006/0248331 A1* | 11/2006 | Harkins .................... 713/155 |
| 2007/0040893 A1* | 2/2007 | Kawakami et al. ........ 348/14.01 |
| 2007/0047480 A1* | 3/2007 | Suga ...................... 370/328 |
| 2007/0066280 A1* | 3/2007 | Arai ....................... 455/411 |
| 2007/0294753 A1* | 12/2007 | Tanaka et al. ............... 726/9 |

\* cited by examiner

COMMUNICATION SYSTEM, MANAGEMENT APPARATUS, CONTROL METHOD THEREFOR, STORAGE MEDIUM, REGISTRATION APPARATUS AND BASE STATION

TECHNICAL FIELD

The present invention relates to a communication system, a management apparatus, a control method therefor, and a storage medium.

BACKGROUND ART

It is necessary for communication using an IEEE802.11 wireless LAN to set, in a device, wireless parameters including a communication channel, network identifier (SSID), encryption scheme, encryption key, authentication scheme, and authentication key. Normally, such wireless parameters are set by using the user interface of a device. However, this work is cumbersome. It is particularly difficult to input the character string of, for example, a network identifier or encryption key to a device except a personal computer (to be referred to as a PC hereinafter), such as a digital camera or printer.

In recent years, easy wireless parameter setting techniques have been proposed. For example, wireless parameter setting methods using portable storage media have been proposed (Japanese Patent Laid-Open No. 2004-013718, U.S. Pre-Granted Publication No. 2005/0272371 (Japanese Patent Laid-Open No. 2004-7351), U.S. Pre-Granted Publication No. 2005/0015467 (Japanese Patent Laid-Open No. 2003-229872), and U.S. Pre-Granted Publication No. 2005/0043019 (Japanese Patent Laid-Open No. 2004-096146)).

Furthermore, a system has been proposed in which a management apparatus for managing wireless parameters to be provided to a wireless communication apparatus connects to a base station via a network (U.S. Pre-Granted Publication No. 2005/0054329 (Japanese Patent Laid-Open No. 2005-86583)).

In such a system in which a management apparatus and a base station are connected to each other via a network, it is regarded that wireless parameter setting processing is executed by transmitting wireless parameters managed by the management apparatus to a wireless communication apparatus via the base station.

If a plurality of management apparatuses exist on a network, however, it is necessary to determine a management apparatus with which wireless parameter setting processing is performed.

DISCLOSURE OF INVENTION

It is an object of the present invention to solve the problem when a management apparatus provides wireless parameters managed by itself to a wireless communication apparatus via a base station. Other objects and features of the present invention will become apparent from the following specification and accompanying drawings.

In order to achieve the above object, a communication system according to the present invention has the following configuration. That is, there is provided a communication system comprising a management apparatus for managing a wireless parameter to be provided to a wireless communication apparatus via a base station by using a wireless parameter setting function, the base station, and the wireless communication apparatus, the management apparatus including a determination unit configured to determine a start of wireless parameter setting processing by the wireless parameter setting function, and a transmission unit configured to transmit a message for causing the base station to register the management apparatus in accordance with the determination by the determination unit, and the base station including a detection unit configured to detect the message transmitted by the transmission unit, a registration unit configured to register a management apparatus as a transmission source of the message detected by the detection unit, and a transmission unit configured to transmit, to the management apparatus registered by the registration unit, a wireless parameter acquisition request from the wireless communication apparatus.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

BEST MODE FOR CARRYING OUT THE INVENTION

Best modes for carrying out the present invention will be described in detail below with reference to the accompanying drawings.

Figure 7:
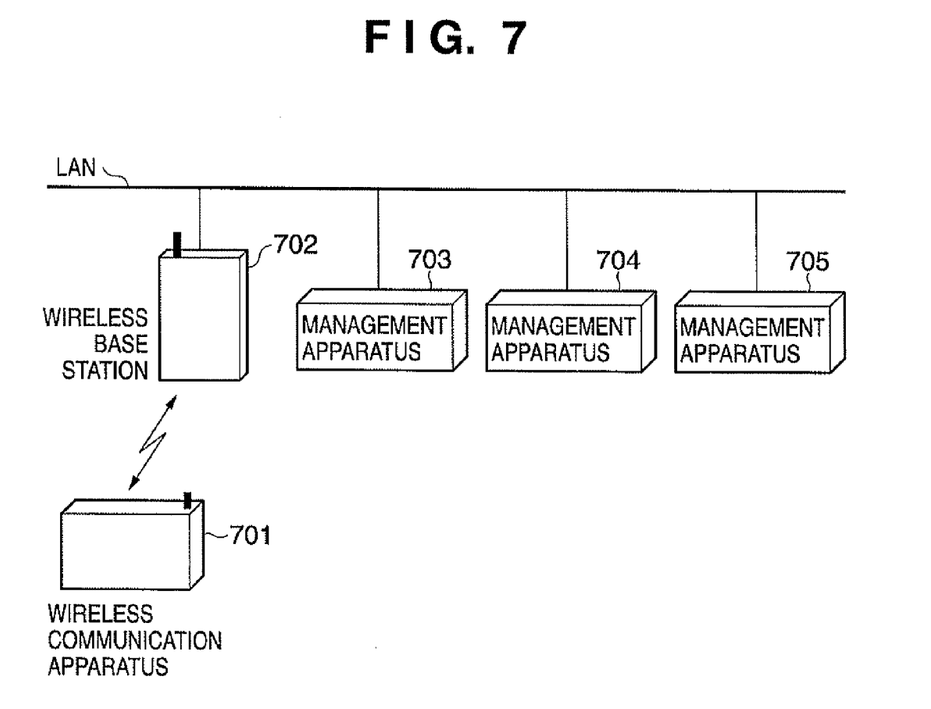
FIG. 7 is a view showing a system configuration according to the second embodiment.

FIG. 7 is a view showing a wireless parameter setting system on which the present invention is based.

A wireless communication apparatus 701 has a wireless communication function using an IEEE802.11 wireless LAN.

A base station (access point or AP) 702 has functions of a wireless network interface, a wired network interface, controlling a wireless signal, encrypting wireless data to be transmitted/received, and authenticating a wireless communication apparatus as a connection request source.

Wireless parameter management apparatuses (to be referred to as management apparatuses hereinafter) 703 to 705, for example, manage wireless parameters in the IEEE802.11 wireless LAN, and provide the wireless communication apparatus with the wireless parameters. Note that the wireless parameters managed by the management apparatuses include a communication channel, network identifier (SSID), encryption scheme, encryption key, authentication scheme, and authentication key. The IEEE802.11 wireless LAN has standards such as 802.11a, 802.11b, and 802.11g. It is also possible to manage, as a wireless parameter, information representing the standard to be used. In this example, PCs in which dedicated software is installed serve as the management apparatuses.

The base station 702 and the management apparatuses 703 to 705 are connected to each other via a wired LAN.

The wireless communication apparatus 701, base station 702, and management apparatuses 703 to 705 have a wireless parameter automatic setting function (to be referred to as a wireless parameter setting sequence hereinafter). By executing the wireless parameter setting sequence, the management apparatuses 703 to 705 can transfer the wireless parameters managed by themselves to the wireless communication apparatus 701 via the base station 702.

Figure 10:
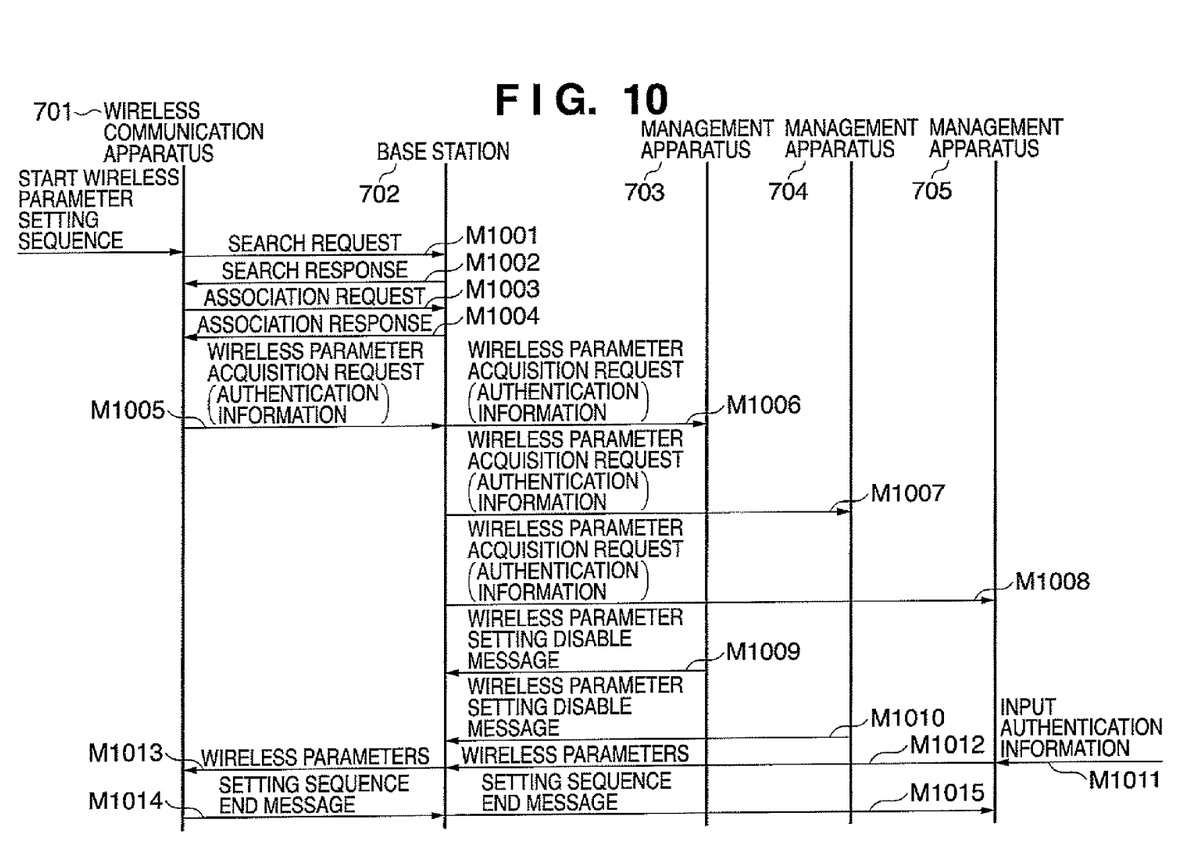
FIG. 10 is a sequence chart when a plurality of management apparatuses are registered in a base station.

Processing for a case in which the wireless parameter setting sequence is used will be explained below with reference to FIG. 10. Assume that the management apparatuses 703 to 705 are registered in the base station 702 in advance.

When a user starts the wireless parameter setting sequence of the wireless communication apparatus 701, the wireless communication apparatus 701 transmits a search request (M1001) for searching for a base station having a wireless parameter setting sequence.

Upon receiving, from the base station 702, a search response (M1002) in response to the search request, the wireless communication apparatus 701 transmits an association request (M1003) for temporary wireless connection with the base station 702. Note that the wireless communication apparatus 701 uses an SSID included in the search response (M1002) to transmit the association request (M1003). When the wireless communication apparatus 701 receives an association response (M1004) from the base station 702, the temporary wireless connection is established between the wireless communication apparatus 701 and the base station 702. Once the temporary wireless connection is established, the wireless communication apparatus 701 can communicate with the management apparatuses 703 to 705 via the base station 702 by using special-purpose packets, even if the wireless parameters such as an encryption key are not set in the wireless communication apparatus 701.

The wireless communication apparatus 701 transmits a wireless parameter acquisition request (M1005) to the base station 702. The wireless parameter acquisition request (M1005) includes authentication information (a password) for authenticating the wireless communication apparatus 701.

The base station 702 transfers the received wireless parameter acquisition request (M1005) to the registered management apparatuses 703 to 705 (M1006 to M1008).

In this example, when the user inputs authentication information to the management apparatus 705 (M1011), the management apparatus 705 compares the authentication information input by the user with that included in the received wireless parameter acquisition request (M1008) If the two pieces of authentication information coincide with each other, the management apparatus 705 transmits the wireless parameters managed by itself to the base station 702 (M1012). The base station 702 transfers, to the wireless communication apparatus 701, the wireless parameters transmitted from the management apparatus 705 (M1013). In this manner, the wireless parameters are set in the wireless communication apparatus 701.

If the authentication information is not input to the management apparatuses 703 and 704, each of the management apparatuses 703 and 704 transmits a wireless parameter setting disable message to the base station 702 (M1009 and M1010).

Upon receiving the wireless parameters, the wireless communication apparatus 701 transmits a wireless parameter setting sequence end message to the base station 702 (M1014). The base station 702 transfers the end message to the management apparatus 705 (M1015). With this processing, the wireless parameter setting sequence ends.

As described above, when there are a plurality of management apparatuses which are registered in the base station, messages pertaining to the wireless parameter sequence are exchanged between all the registered management apparatuses and the base station. Consequently, there is unwanted communication traffic between the base station and management apparatuses other than the desired one. The unwanted communication traffic increases, as the number of the management apparatuses increases. Furthermore, this prolongs the time taken to set the wireless parameters in the wireless communication apparatus.

The embodiments to be described aim at solving the above problems.

<First Embodiment>

Figure 1:
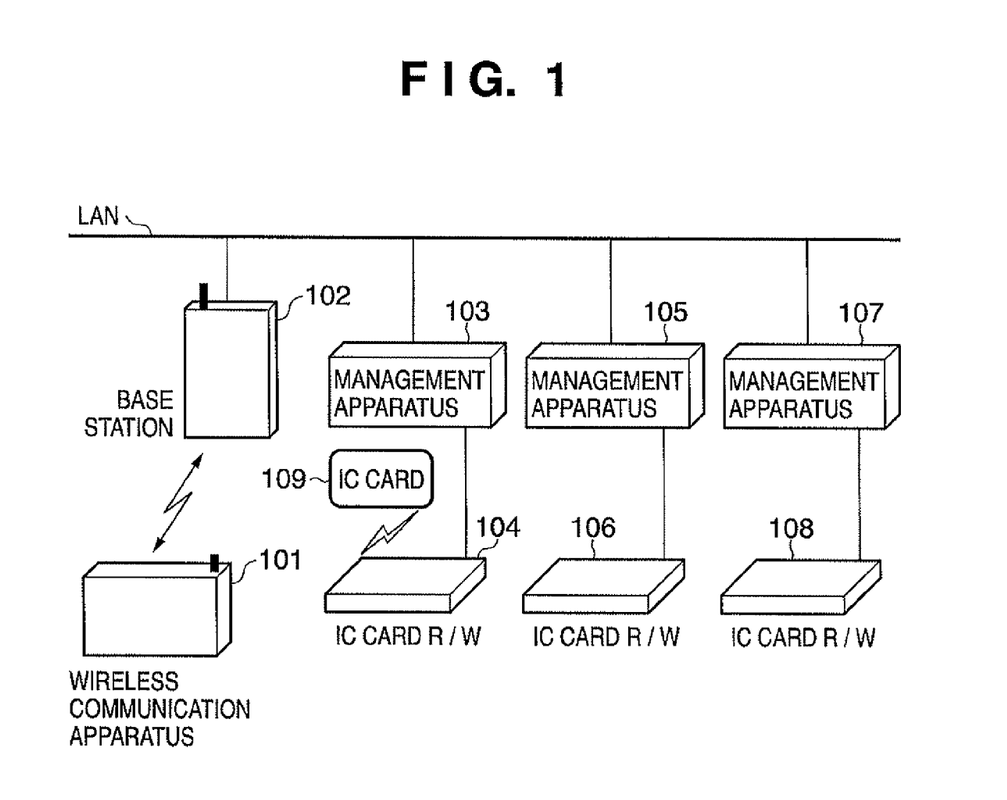
FIG. 1 is a view showing a system configuration according to the first embodiment.

FIG. 1 is a view showing a system configuration according to the first embodiment. A network shown in FIG. 1 comprises a wireless communication apparatus 101, a base station 102, management apparatuses 103, 105, and 107, IC card readers/writers 104, 106, and 108, and an IC card 109.

The wireless communication apparatus 101 has a wireless communication function using an IEEE802.11 wireless LAN.

The base station 102 has functions of a wireless network interface, a wired network interface, controlling a wireless signal, encrypting wireless data to be transmitted/received, and authenticating a wireless communication apparatus as a connection request source.

The management apparatuses 103, 105, and 107, for example, manage wireless parameters in the IEEE802.11 wireless LAN, and provide the wireless communication apparatus with the wireless parameters. Note that the wireless parameters managed by the management apparatuses include a communication channel, network identifier (SSID), encryption scheme, encryption key, authentication scheme, and authentication key. The IEEE802.11 wireless LAN has standards such as 802.11a, 802.11b, and 802.11g. It is also possible to manage, as a wireless parameter, information representing the standard to be used. Each of the management apparatuses 103, 105, and 107 manages one or more wireless parameters. Note that the wireless parameters managed by the management apparatuses 103, 105, and 107 may be wireless parameters for wireless connection with the base station 102 or those for wireless connection with the other base stations. In this example, PCs in which dedicated software is installed serve as the management apparatuses.

The base station 102 and the management apparatuses 103, 105, and 107 are connected to each other via the wired LAN. The management apparatuses 103, 105, and 107 are respectively connected to the IC card readers/writers 104, 106, and 108 via USB.

The wireless communication apparatus 101, the base station 102, and the management apparatuses 103, 105, and 107 have a wireless parameter automatic setting function (wireless parameter setting sequence). By starting the wireless parameter setting sequence, the management apparatuses 103, 105, and 107 can transfer the wireless parameters managed by themselves to the wireless communication apparatus 101 via the base station 102.

Figure 2:
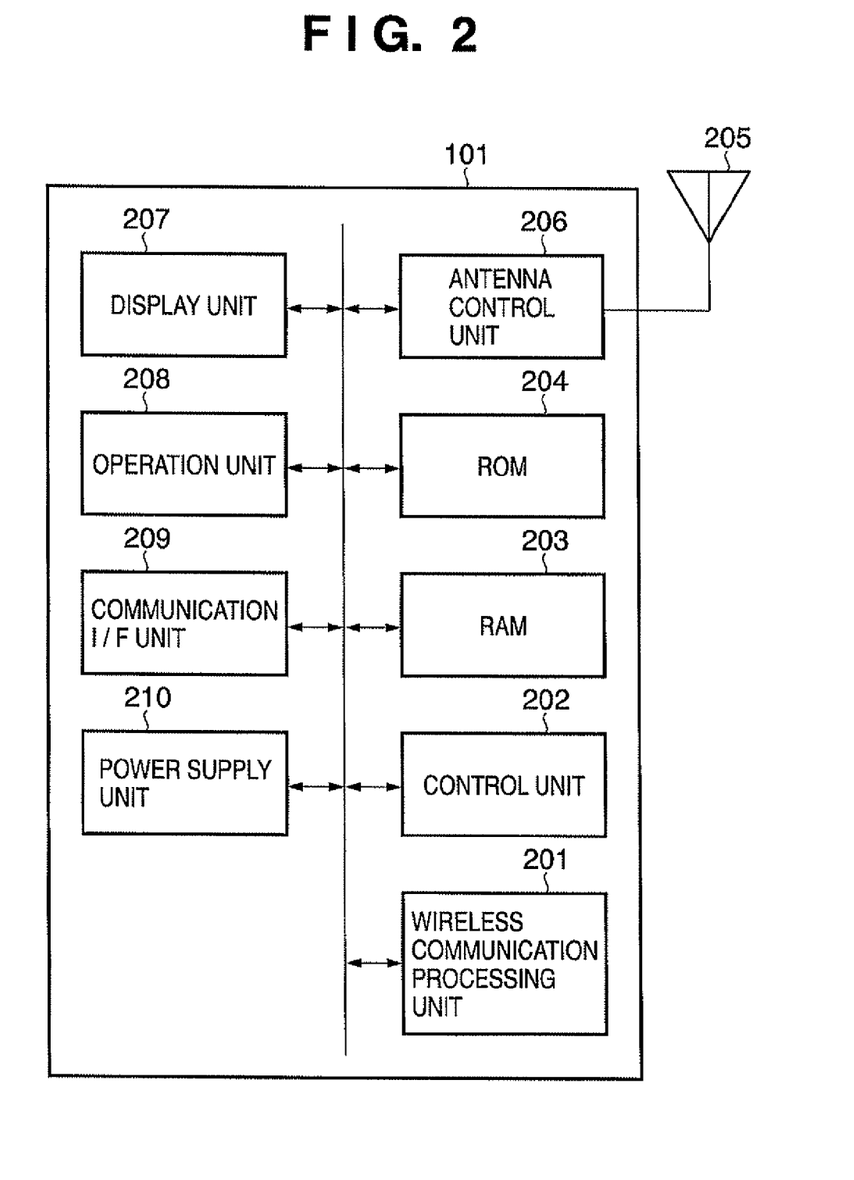
FIG. 2 is a block diagram showing the configuration of a wireless communication apparatus.

FIG. 2 is a block diagram showing the configuration of the wireless communication apparatus 101.

A wireless communication processing unit 201 controls communication in the IEEE802.11 wireless LAN. A control unit 202 controls the whole wireless communication apparatus in accordance with a program stored in a ROM 204.

A RAM 203 is a work area used by the control unit 202 when it executes control, and is a memory in which various tables are defined. The ROM 204 stores a control program, control data, and the like.

An antenna control unit 206 controls an antenna 205. A display unit 207 displays the state of the wireless communication apparatus and an operation input in an operation unit (to be described later) by using, for example, an LCD or LED. An operation unit 208 includes a button for instructing an operation of the wireless communication apparatus.

A reference numeral 209 denotes a communication interface (I/F) unit for wired communication, such as USB and IEEE1394. A reference numeral 210 denotes a power supply unit.

Figure 3:
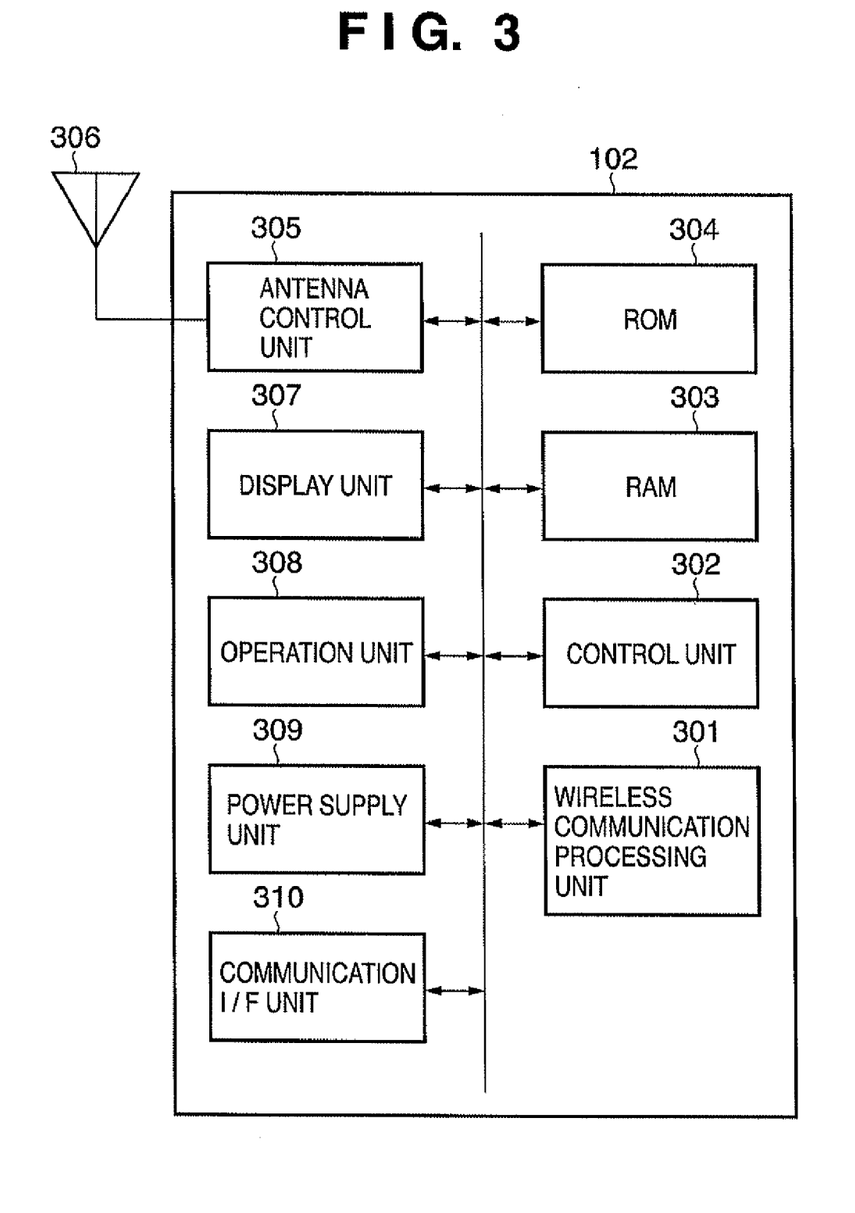
FIG. 3 is a block diagram showing the configuration of a base station.

FIG. 3 is a block diagram showing the configuration of the base station 102.

A wireless communication processing unit 301 controls communication in the IEEE802.11 wireless LAN. A control unit 302 controls the whole base station in accordance with a program stored in a ROM 304.

A RAM 303 is a work area used by the control unit 302 when it executes control, and is a memory in which various tables are defined. The ROM 304 stores a control program, control data, and the like.

An antenna control unit 305 controls an antenna 306. A display unit 307 displays the state of the base station and an operation input in an operation unit (to be described later) by using, for example, an LCD or LED. An operation unit 308 includes a button for instructing an operation of the base station.

A reference numeral 309 denotes a power supply unit. A reference numeral 310 denotes a communication I/F unit for wired communication, such as USB and IEEE1394.

Figure 4:
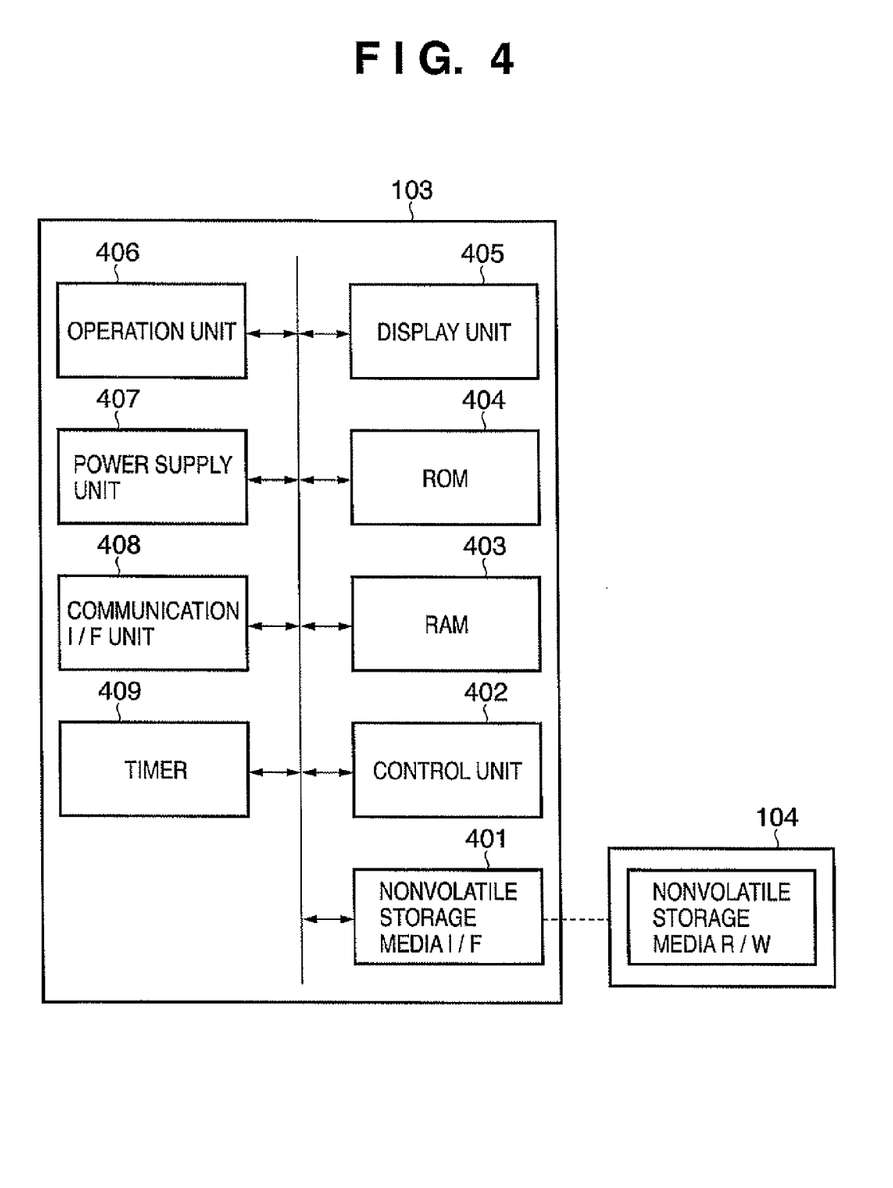
FIG. 4 is a block diagram showing the configurations of a management apparatus and an IC card reader/writer.

FIG. 4 is a block diagram showing the configurations of the management apparatus 103 and the IC card reader/writer 104.

A nonvolatile storage media I/F 401 is an I/F unit for the IC card reader/writer 104.

A control unit 402 controls the whole management apparatus in accordance with a program stored in a ROM 404.

A RAM 403 is a work area used by the control unit 402 when it executes control, and is a memory in which various tables are defined. The RAM 403 stores information (e.g., MAC addresses) of the management apparatuses registered as management apparatuses.

Figure 6:
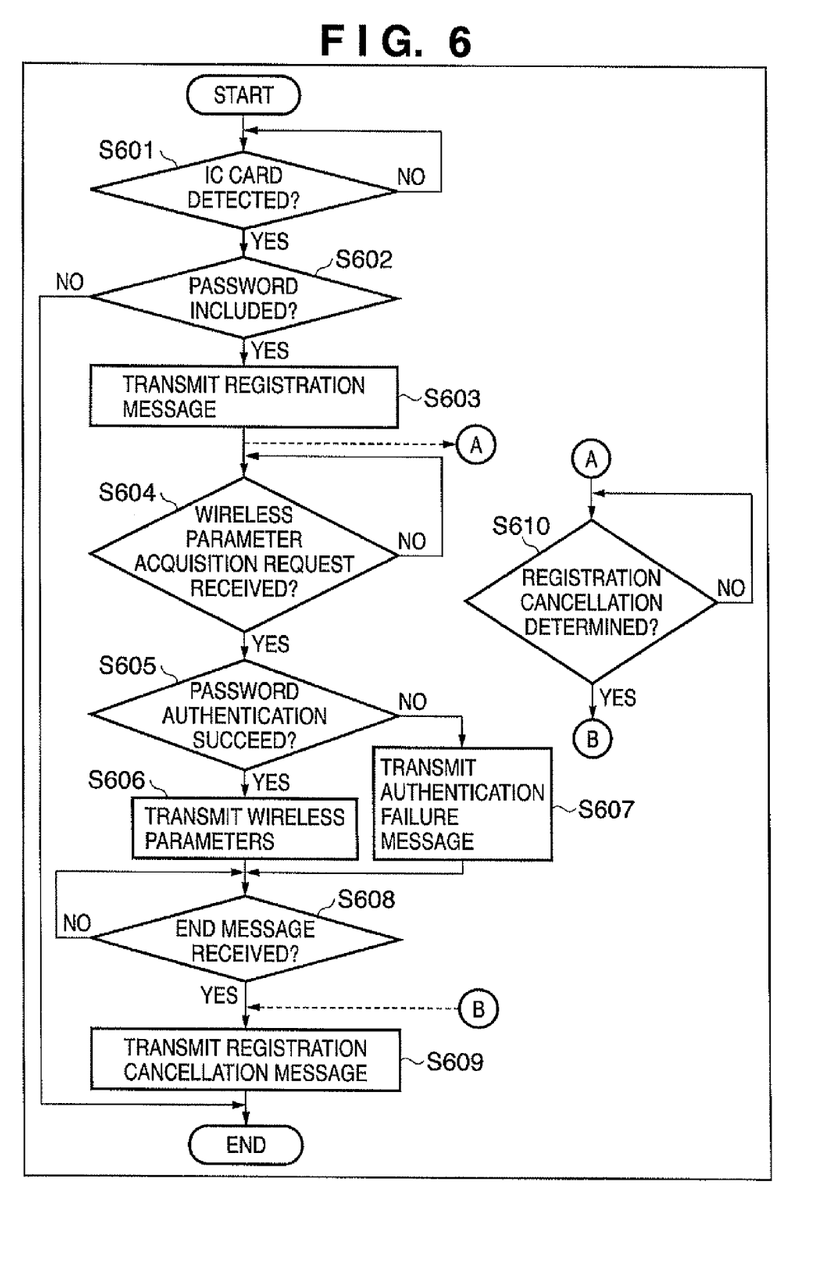
FIG. 6 is an operation flowchart of a management apparatus 103 according to the first embodiment.
Figure 9:
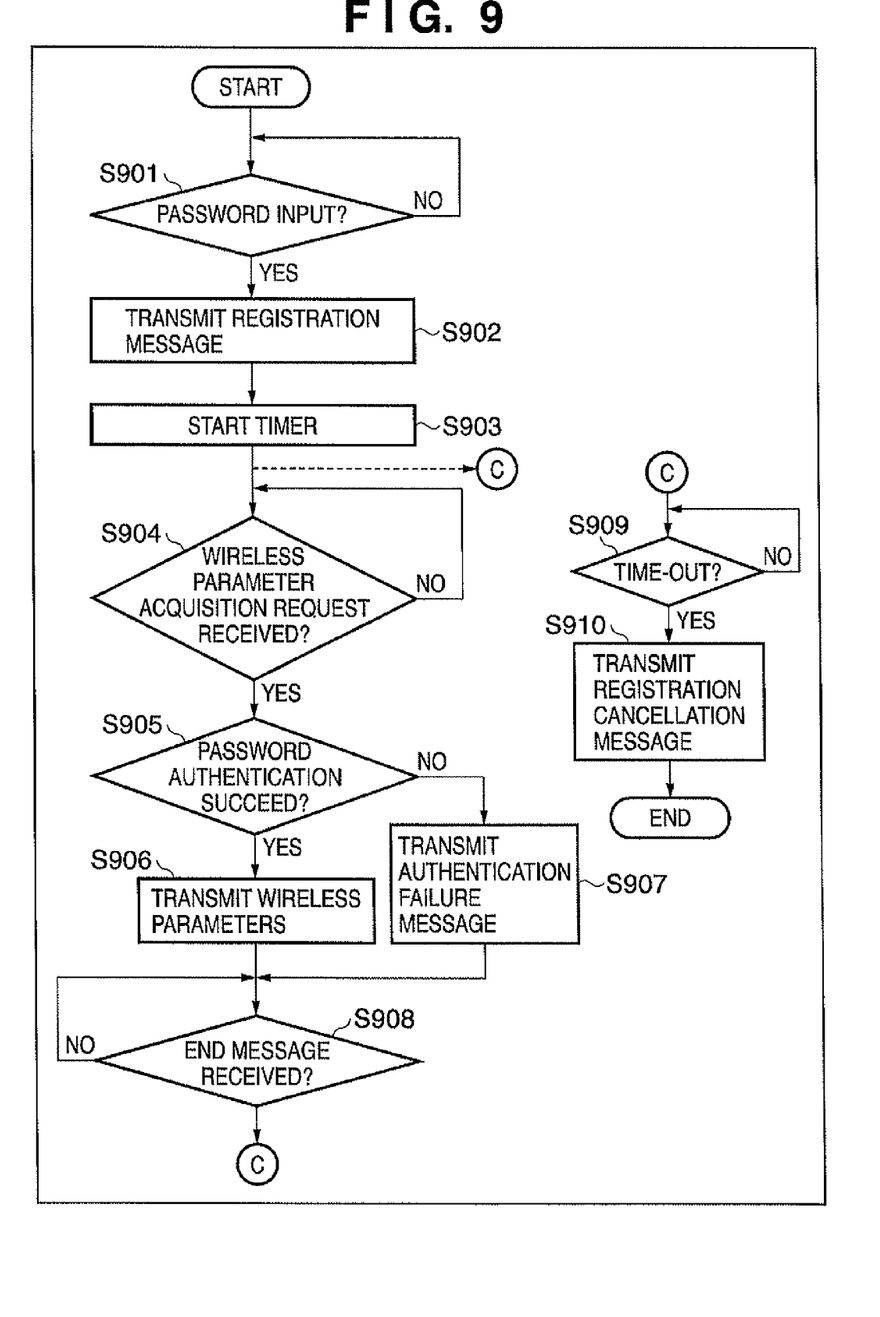
FIG. 9 is an operation flowchart of a management apparatus 703 according to the second embodiment.

The ROM 404 stores control programs shown in FIGS. 6 and 9 (to be described later), control data, and the like.

A display unit 405 displays the state of the management apparatus, and an operation input in an operation unit (to be described later) by using, for example, an LCD or LED. An operation unit 406 includes a button for instructing an operation of the management apparatus.

A reference numeral 407 denotes a power supply unit. A reference numeral 408 denotes a communication I/F unit such as USB and IEEE1394. A timer 409 performs time measurement.

The configurations of the management apparatuses 105 and 107 and the IC card readers/writers 106 and 108 are the same as those of the management apparatus 103 and the IC card reader/writer 104 respectively, and a description thereof will be omitted.

Assume that the ROM of the wireless communication apparatus 101 and the IC card 109 store authentication information used for the wireless parameter setting sequence in advance. Assume also that a password (e.g., OB2D5F7) is used as the authentication information.

The IC card 109 and the IC card readers/writers 104, 106, and 108 have a communication function using NFC (Near Field Communication). When the IC card 109 is held over any one of the IC card readers/writers 104, 106, and 108, the corresponding IC card reader/writer reads the password stored in the IC card 109 by using NFC, and transmits it to the connected management apparatus. In this way, the management apparatuses 103, 105, and 107 can acquire the password stored in the IC card 109.

Assume that the management apparatuses 103, 105, and 107 are not registered as management apparatuses in the base station 102 in a normal state. The management apparatuses 103, 105, and 107 are connected to the base station 102 via the wired LAN. The base station 102, however, does not transmit messages pertaining to the wireless parameter setting sequence unless the management apparatuses 103, 105, and 107 are registered as management apparatuses in the base station 102.

The wireless parameter setting processing according to the first embodiment will be explained below with reference to FIGS. 5 and 6.

Figure 5:
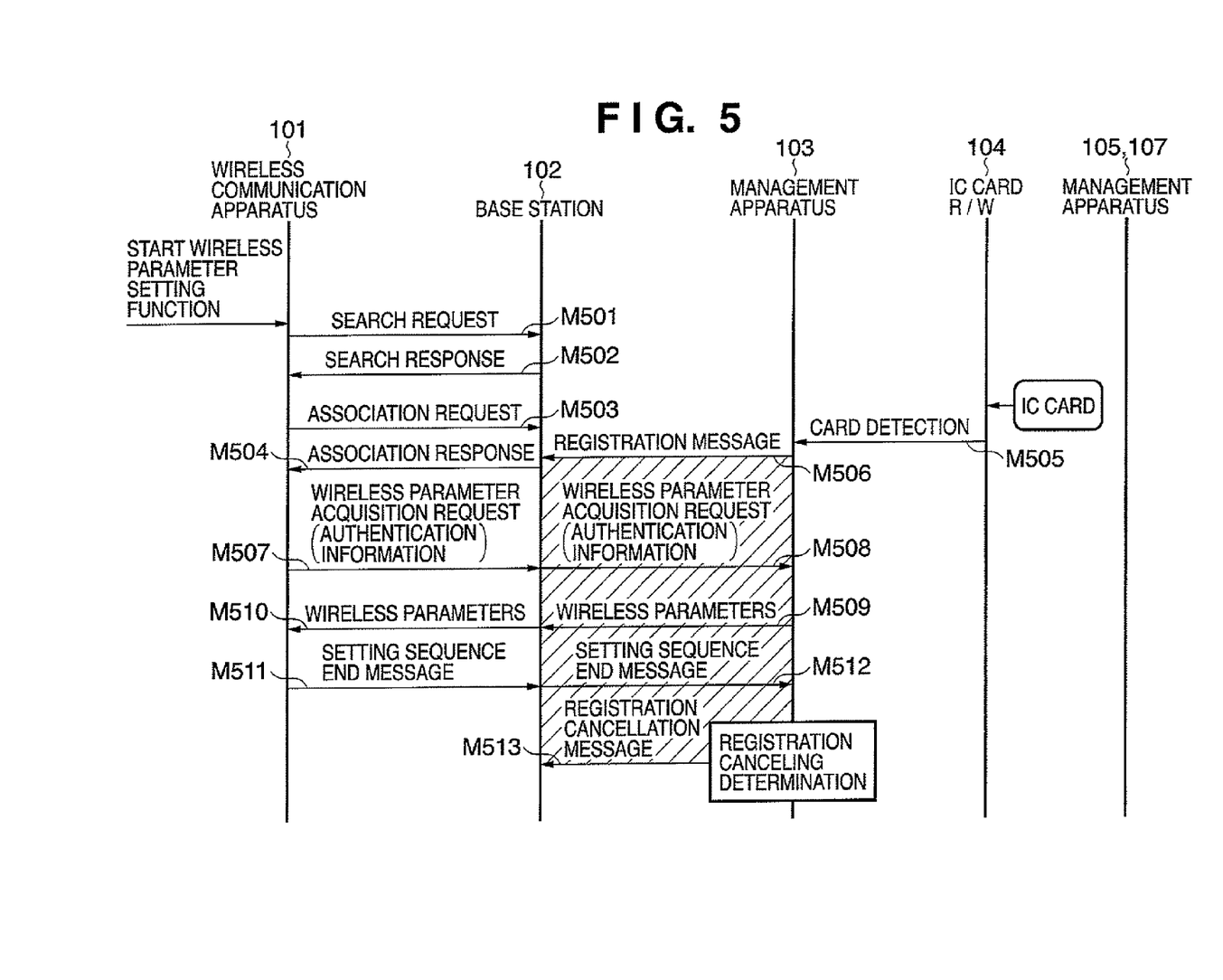
FIG. 5 is a sequence chart according to the first embodiment.

FIG. 5 is a sequence chart of the devices when the IC card 109 is held over the IC card reader/writer 104. FIG. 6 is an operation flowchart of the management apparatus 103.

When a user starts the wireless parameter setting sequence of the wireless communication apparatus 101, the wireless communication apparatus 101 transmits a search request (M501) for searching for a base station having a wireless parameter setting sequence.

Upon receiving, from the base station 102, a search response (M502) in response to the search request, the wireless communication apparatus 101 transmits an association request (M503) for temporary wireless connection with the base station 102. Note that the wireless communication apparatus 101 uses an SSID included in the search response (M502) to transmit the association request (M503). When the wireless communication apparatus 101 receives an association response (M504) from the base station 102, the temporary wireless connection is established between the wireless communication apparatus 101 and the base station 102. Once the temporary wireless connection is established, the wireless communication apparatus 101 can communicate with the management apparatuses 103, 105, and 107 via the base station 102 by using special-purpose packets, even if the wireless parameters such as an encryption key are not set in the wireless communication apparatus 101.

Upon detecting the IC card 109 through the IC card reader/writer 104 (M505) (Yes in step S601), the management apparatus 103 determines whether the IC card 109 stores a password (step S602).

If the password is stored (Yes in step S602), the management apparatus 103 transmits, to the base station 102, a message (M506) for causing the base station 102 to register as a management apparatus (step S603). The management apparatus 103 determines that the wireless parameter setting sequence has started by detecting that the IC card 109 stores the password (Yes in step S602).

The base station 102 which has received the registration message (M506) registers the management apparatus 103 as a management apparatus. This allows the management apparatus 103 to transmit/receive messages pertaining to the wireless parameter setting sequence.

The wireless communication apparatus 101 transmits a wireless parameter acquisition request (M507) including the password to the base station 102. The base station 102 then transfers the received wireless parameter acquisition request to the registered management apparatus 103 (M508). As described above, the wireless parameter acquisition request is not transmitted to the management apparatuses 105 and 107 which are not registered as management apparatuses in the base station 102.

Upon receiving the wireless parameter acquisition request (M508) (Yes in step S604), the management apparatus 103 executes authentication processing by comparing the password included in the received wireless parameter acquisition request (M508) with that acquired from the IC card 109 (step S605).

If the authentication succeeds (Yes in step 605), the management apparatus 103 transmits wireless parameters managed by itself to the base station 102 (M509 and step S606). The base station 102 transfers, to the wireless communication apparatus 101, the wireless parameters transmitted from the management apparatus 103 (M510). In this manner, the wireless parameters managed by the management apparatus 103 are set in the wireless communication apparatus 101.

If the authentication fails (No in step S605), the management apparatus 103 transmits an authentication failure message to the base station (step S607). The base station 102 transfers, to the wireless communication apparatus 101, the authentication failure message transmitted from the management apparatus 103.

Upon receiving the wireless parameters, the wireless communication apparatus 101 transmits a wireless parameter setting sequence end message to the base station 102 (M511). The base station 102 transfers the end message to the management apparatus 103 (M512). With this processing, the wireless parameter setting sequence ends.

Upon receiving the wireless parameter setting sequence end message (M512) from the base station 102 (Yes in step S608), the management apparatus 103 transmits, to the base station 102, a message (M513) for causing the base station 102 to cancel the registration (step S609). The base station 102 which has received the registration cancellation message (M513) cancels the registration of the management apparatus 103. After the registration is canceled, the messages pertaining to the wireless parameter setting sequence will not be transmitted to the management apparatus 103 any more.

In the above processing, when the end of the wireless parameter setting sequence is detected, registration as a management apparatus is canceled. The management apparatus 103 may, however, determine based on other determination criteria whether to cancel the registration (step S610) after transmitting the registration message (M506) (step S603). If the management apparatus 103 determines to cancel the registration (Yes in step S610), it may transmit the registration cancellation message to the base station 102 regardless of whether the wireless parameter setting sequence ends (step S609).

When, for example, the management apparatus 103 transmits the wireless parameters (step S606) or the authentication failure message (step S607) to the base station 102, the management apparatus 103 may determine to cancel the registration.

The timer 409 is set when the registration message is transmitted. The management apparatus 103 may determine to cancel the registration when the timer expires. Even if the timer expires, the registration need not be canceled when the wireless parameter setting sequence has not ended. The setting timing of the timer 409 is not limited to that when the registration message is transmitted. The timer 409 may be set when the password within the IC card is detected or when the wireless parameters are transmitted.

The management apparatus 103 may determine to cancel the registration when the IC card is detected again. In this case, when the IC card 109 is held over the IC card reader/writer 104 for the first time, the management apparatus 103 detects the IC card 109, and transmits the registration message to the base station 102. When the IC card 109 is held over the IC card reader/writer 104 again, the management apparatus detects again the IC card 109, and determines to cancel the registration.

The management apparatus 103 may determine to cancel the registration when the IC card cannot be detected any more. In this case, when the IC card 109 is held over the IC card reader/writer 104, the management apparatus 103 detects the IC card 109, and transmits the registration message to the base station 102. The management apparatus 103 is registered as a management apparatus in the base station 102 while the IC card 109 is held over the IC card reader/writer 104. When the IC card 109 is removed from the IC card reader/writer, the management apparatus 103 cannot detect the IC card 109 any more, and determines to cancel the registration.

A registration canceling determination method is not limited to them.

In the first embodiment, the management apparatus 103 determines the start of the wireless parameter setting sequence upon detecting that the IC card 109 stores the password (Yes in step S602). A start instruction button for the wireless parameter setting sequence may be provided. In this case, even though the management apparatus 103 transmits the registration message upon detecting that the IC card 109 stores the password, the wireless parameter setting sequence is not performed unless the start instruction button for the wireless parameter setting sequence is operated.

An IC card reader/writer is externally connected to each management apparatus in the first embodiment, but may be incorporated in it.

An IC card is used as a storage medium storing authentication information (a password) in the first embodiment. Any portable storage medium such as a memory card may, however, be used.

Although the case in which NFC is used has been explained in the first embodiment, other methods are available as long as a management apparatus can acquire authentication information (a password) from an IC card. For example, the IC card may be directly connected to the management apparatus via, for example, USB and a card slot.

Although a wired LAN connects between a base station and management apparatuses in the first embodiment, a wireless LAN may be used instead.

In the first embodiment, a password is used as authentication information. The authentication information is, however, not limited to this.

According to the first embodiment, when a wireless parameter setting sequence is executed, a management apparatus is registered in a base station. Consequently, messages pertaining to the wireless parameter setting sequence are not transmitted to management apparatuses other than the desired one. This makes it possible to decrease unwanted communication traffic between the base station and the management apparatuses other than the desired one. Particularly when the base station and the management apparatus are wirelessly connected to each other via a wireless LAN, it is possible to prevent use of an unwanted bandwidth.

Even if a plurality of management apparatuses exist on a network, a base station transmits/receives messages pertaining to a wireless parameter setting sequence to/from a desired management apparatus. This makes it possible to reduce the time taken to set wireless parameters.

<Second Embodiment>

In the second embodiment, an example in which any portable storage medium such as an IC card is not used will be described.

FIG. 7 is a view showing a system configuration according to the second embodiment. A network shown in FIG. 7 comprises a wireless communication apparatus 701, a base station 702, and management apparatuses 703 to 705.

The wireless communication apparatus 701 has a wireless communication function using an IEEE802.11 wireless LAN.

The base station 702 has functions of a wireless network interface, a wired network interface, controlling a wireless signal, encrypting wireless data to be transmitted/received, and authenticating a wireless communication apparatus as a connection request source.

The management apparatuses 703 to 705, for example, manage wireless parameters in the IEEE802.11 wireless LAN, and provide the wireless communication apparatus with the wireless parameters. Note that the wireless parameters managed by the management apparatuses include a communication channel, network identifier (SSID), encryption scheme, encryption key, authentication scheme, and authentication key. The IEEE802.11 wireless LAN has standards such as 802.11a, 802.11b, and 802.11g. It is also possible to manage, as a wireless parameter, information representing the standard to be used. Each of the management apparatuses 703 to 705 manages one or more wireless parameters. Note that the wireless parameters managed by the management apparatuses 703 to 705 may be wireless parameters for wireless connection with the base station 702 or those for wireless connection with the other base stations. In this example, PCs in which dedicated software is installed serve as the management apparatuses.

The base station 702 and the management apparatuses 703 to 705 are connected to each other via a wired LAN.

The wireless communication apparatus 701, base station 702, and management apparatuses 703 to 705 have a wireless parameter setting sequence. By starting the wireless parameter setting sequence, the management apparatuses 703 to 705 can transfer the wireless parameters managed by themselves to the wireless communication apparatus 701 via the base station 702.

The configurations of the wireless communication apparatus 701, the base station 702, and the management apparatuses 703 to 705 are the same as those described in the first embodiment (FIGS. 2 to 4), and a description thereof will be omitted.

In the second embodiment, assume that the ROM of the wireless communication apparatus 701 does not store authentication information used for the wireless parameter setting sequence. Assume also that a password (e.g., OB2D5F7) is used as the authentication information. In the second embodiment, when a user inputs a password to the wireless communication apparatus 701, the wireless parameter setting sequence starts.

Assume that the management apparatuses 703 to 705 are not registered as management apparatuses in the base station 702 in a normal state. The management apparatuses 703 to 705 are connected to the base station 702 via the wired LAN.

In this case, the base station 702 does not transmit messages pertaining to the wireless parameter setting sequence unless the management apparatuses 703 to 705 are registered in the base station 702.

The wireless parameter setting processing according to the second embodiment will be explained below with reference to FIGS. 8 and 9.

Figure 8:
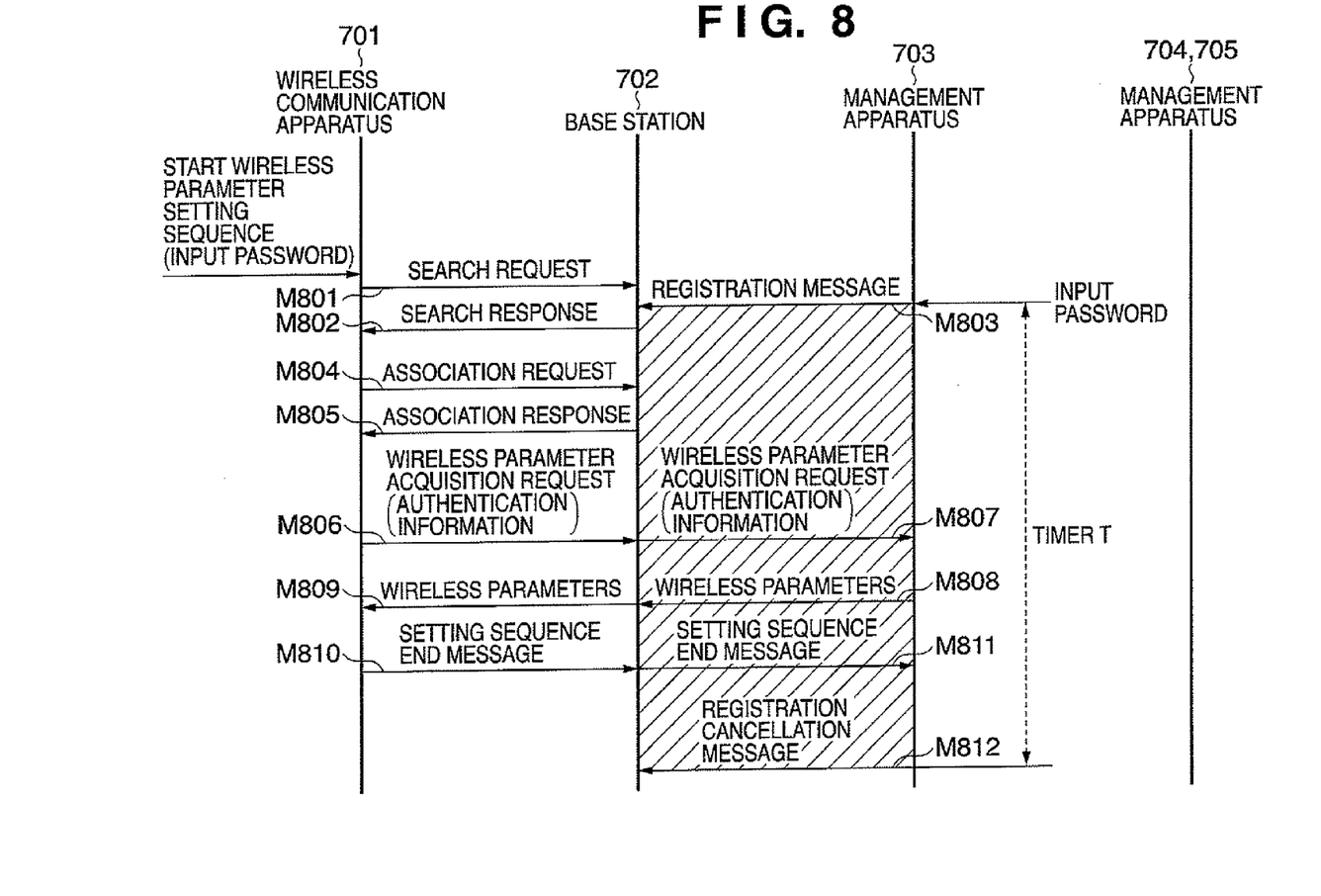
FIG. 8 is a sequence chart according to the second embodiment.

FIG. 8 is a sequence chart when a user inputs a password to both the wireless communication apparatus 701 and the management apparatus 703. FIG. 9 is an operation flowchart of the management apparatus 703.

When a user inputs a password through the operation unit 208 of the wireless communication apparatus 701, the wireless parameter setting sequence starts. The wireless communication apparatus 701 transmits a search request (M801) for searching for a base station having a wireless parameter setting sequence.

Upon receiving, from the base station 702, a search response (M802) in response to the search request, the wireless communication apparatus 701 transmits an association request (M804) for temporary wireless connection with the base station 702. Note that the wireless communication apparatus 701 uses an SSID included in the search response (M802) to transmit the association request (M804). When the wireless communication apparatus 701 receives an association response (M805) from the base station 702, the temporary wireless connection is established between the wireless communication apparatus 701 and the base station 702. Once the temporary wireless connection is established, the wireless communication apparatus 701 can communicate with the management apparatuses 703 to 705 via the base station 702 by using special-purpose packets, even if the wireless parameters such as an encryption key are not set in the wireless communication apparatus 701.

If the user inputs a password through the operation unit 406 of the management apparatus 703 (Yes in step S901), the management apparatus 703 stores the password in the RAM 403. The management apparatus 703 transmits, to the base station 702, a message (M803) for causing the base station 702 to register as a management apparatus (step S902). Note that the management apparatus 703 determines that the wireless parameter setting sequence has started by detecting the input of the password by the user (Yes in step S901).

The base station 702 which has received the registration message (M803) registers the management apparatus 703 as a management apparatus. This allows the management apparatus 703 to transmit/receive messages pertaining to the wireless parameter setting sequence.

The management apparatus 703 sets a time-out value, and starts a timer 409 (step S903) when transmitting the registration message (M803). The management apparatus 703 then monitors during the subsequent processing whether a time-out of the timer 409 occurs (step S909).

The time-out value may be set randomly, or may be set by the user. The setting method is not limited.

The wireless communication apparatus 701 transmits a wireless parameter acquisition request (M806) including a password to the base station 702. The base station 702 transfers the received wireless parameter acquisition request to the registered management apparatus 703 (M807). As explained above, the wireless parameter acquisition request is not transmitted to the management apparatuses 704 and 705 which are not registered as management apparatuses in the base station 702.

Upon receiving the wireless parameter acquisition request (M807) (Yes in step S904), the management apparatus 703 performs authentication processing by comparing the password included in the received wireless parameter acquisition request (M807) with that input by the user (step S905).

If the authentication succeeds (Yes in step S905), the management apparatus 703 transmits wireless parameters managed by itself to the base station 702 (M808 and step S906). The base station 702 transfers, to the wireless communication apparatus 701, the wireless parameters transmitted from the management apparatus 703 (M809). In this way, the wireless parameters managed by the management apparatus 703 are set in the wireless communication apparatus 701.

If the authentication fails (No in step S905), the management apparatus 703 transmits an authentication failure message to the base station (step S907). The base station 702 transfers, to the wireless communication apparatus 701, the authentication failure message transmitted from the management apparatus 703.

Upon receiving the wireless parameters, the wireless communication apparatus 701 transmits a wireless parameter setting sequence end message to the base station 702 (M810). The base station 702 transfers the end message to the management apparatus 703 (M811). The management apparatus 703 receives the end message (M811) from the base station 702 (step S908). With this processing, the wireless parameter setting sequence ends.

When a time-out of the timer 409 has occurred (Yes in step S909), the management apparatus 703 transmits, to the base station 702, a message (M812) for causing the base station 702 to cancel the registration (step S910). The base station 702 which has received the registration cancellation message (M812) cancels the registration of the management apparatus 703. Once the registration is canceled, messages pertaining to the wireless parameter setting sequence will not be transmitted to the management apparatus 703 any more.

In the above processing, when a time-out of the timer 409 is detected, the registration as a management apparatus is canceled. Registration canceling determination may, however, be executed based on other determination criteria.

For example, upon detecting the end of the wireless parameter setting sequence, the management apparatus 703 may determine to cancel the registration. In this case, upon receiving the wireless parameter setting sequence end message from the base station 702 (Yes in step S908), the management apparatus 703 determines to cancel the registration.

When transmitting the wireless parameters (step S906) or the authentication failure message (step S907) to the base station 702, the management apparatus 703 may determine to cancel the registration.

The determination criteria for canceling the registration are not limited to them.

In the second embodiment, the management apparatus 703 determines the start of the wireless parameter setting sequence upon detecting the input of the password by the user (Yes in step S901). A start instruction button for the wireless parameter setting sequence may be provided. In this case, although the management apparatus 103 transmits the registration message upon detecting the input of the password by the user, the wireless parameter setting sequence is not performed unless the start instruction button for the wireless parameter setting sequence is operated.

Although a wired LAN connects a base station and management apparatuses in the second embodiment, a wireless LAN may be used instead.

In the second embodiment, a password is used as authentication information. The authentication information is, however, not limited to this.

According to the second embodiment, even if, unlike the first embodiment, a portable storage medium such as an IC card cannot be used, the same effect as in the first embodiment can be obtained.

In the above embodiments, when an IC card is detected or when a user inputs a password, the management apparatus transmits a registration message to a base station. The transmission timing of the registration message is not limited to them. Upon detecting power-on of the management apparatus, the transmission may be executed.

As described above, according to the embodiments, messages pertaining to a wireless parameter setting sequence are not transmitted to management apparatuses other than a registered one. This is because a desired management apparatus is registered in a base station when the wireless parameter setting sequence is performed. This makes it possible to decrease unwanted communication traffic as compared with a case in which a plurality of management apparatuses are registered in a base station all the time. Particularly when a base station and management apparatuses are wirelessly connected to each other via, for example, a wireless LAN, it is possible to prevent use of an unwanted bandwidth.

Even if a plurality of management apparatuses exist on a network, a base station transmits/receives messages pertaining to a wireless parameter setting sequence to/from a desired management apparatus. This makes it possible to reduce the time taken to set wireless parameters.

A wireless communication apparatus in the above embodiments may be any device such as a digital camera, printer, and personal computer.

A case in which an IEEE802.11 wireless LAN is used has been described in the above embodiments. The present invention is, however, applicable to other wireless communication schemes such as UWB and WiMax. Furthermore, the present invention is applicable not only to a case in which parameters for wireless communication are set but also to a case in which parameters for wired communication are set.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Application No. 2006-343055 filed on Dec. 20, 2006, which is hereby incorporated by reference herein in its entirety.

The invention claimed is:

1. A communication system comprising:
a management apparatus for managing a wireless parameter to be provided to a wireless communication apparatus via a base station by using a wireless parameter setting function, the base station, and the wireless communication apparatus,
the management apparatus comprising:
a first detection unit configured to detect input of authentication information to be used for authenticating the wireless communication apparatus by the management apparatus in a wireless parameter setting processing for setting wireless parameters managed by the management apparatus on the wireless communication apparatus; and
a first transmission unit configured to transmit a registration request message for causing the base station to register the management apparatus in accordance with the detection by the first detection unit; and the base station comprising:
- a second detection unit configured to detect the registration request message transmitted by the first transmission unit;
- a registration unit configured to register the management apparatus transmitting the request message in response to detection by the second detection unit;
- a transfer unit configured to transfer, to the management apparatus, a wireless parameter acquisition request and authentication information to be used for setting wireless parameters received from the wireless communication apparatus in a case where the registration unit has registered the management apparatus; and
- a cancellation unit configured to cancel the registration of the management apparatus, in response to an end of the wireless parameter setting processing.

2. A management apparatus which manages a wireless parameter to be provided to a wireless communication apparatus via a base station by using a wireless parameter setting function, comprising:
- a first detection unit configured to detect input of authentication information to be used for authenticating the wireless communication apparatus by the management apparatus in a wireless parameter setting processing for setting wireless parameters managed by the management apparatus on the wireless communication apparatus;
- a transmission unit configured to transmit a registration request message for causing the base station to register the management apparatus in accordance with the detection by the first detection unit; and
- a cancellation unit configured to execute a cancel processing for which the base station cancels a registration of the management apparatus in response to an end of the wireless parameter setting processing.

3. The apparatus according to claim 2,
wherein the cancellation unit transmits a cancel message which causes the base station to cancel the registration of the management apparatus in response to the end of the wireless parameter setting processing.

4. The apparatus according to claim 3, wherein the cancellation unit transmits the cancel message to the base station when a certain period of time elapses from the transmission by the transmission unit or the detection by the first detection unit.

5. The apparatus according to claim 3, further comprising:
- a second detection unit configured to detect a portable storage medium,
wherein the cancellation unit transmits the cancel message to the base station when the portable storage medium is detected again or cannot be detected by the second detection unit.

6. The apparatus according to claim 2, wherein the authentication information is information stored in a portable storage medium.

7. The apparatus according to claim 2, wherein the authentication information is information input by a user.

8. A control method of a wireless management apparatus which manages a wireless parameter to be provided to a wireless communication apparatus via a base station by using a wireless parameter setting function, comprising the steps of:
- detecting input of authentication information to be used for authenticating the wireless communication apparatus by the management apparatus in wireless parameter setting processing for setting wireless parameters managed by the management apparatus on the wireless communication apparatus;
- transmitting a registration request message for causing the base station to register the wireless management apparatus in accordance with the detection in the detecting step; and
- executing a cancel processing for which the base station cancels a registration of the management apparatus in response to an end of the wireless parameter setting processing.

9. A non-transitory computer-readable storage medium which stores a computer-executable program for causing a computer to execute the control method according to claim 8.

10. The apparatus according to claim 2, further comprising:
- an authentication unit configured to perform authentication processing based on the authentication information which is input to the management apparatus and authentication information which is transmitted from the wireless communication apparatus via the base station; and
- a setting unit configured to transmit, when the authentication unit performs authentication processing, the wireless parameter managed by the management apparatus to the wireless communication apparatus via the base station to set the wireless parameter on the wireless communication apparatus.

* * * * *